(12) United States Patent
Moore

(10) Patent No.: US 11,132,305 B1
(45) Date of Patent: Sep. 28, 2021

(54) AUTOMATIC STATIC REGION GENERATION FOR MEMORY PROTECTION UNITS (MPUS)

(71) Applicant: Ralph Crittenden Moore, Costa Mesa, CA (US)

(72) Inventor: Ralph Crittenden Moore, Costa Mesa, CA (US)

( * ) Notice: Subject to any disclaimer, the term of this patent is extended or adjusted under 35 U.S.C. 154(b) by 9 days.

(21) Appl. No.: 16/899,373

(22) Filed: Jun. 11, 2020

(51) Int. Cl.
*G06F 12/14* (2006.01)
*G06F 8/41* (2018.01)
*G06F 12/02* (2006.01)

(52) U.S. Cl.
CPC ............ *G06F 12/1441* (2013.01); *G06F 8/41* (2013.01); *G06F 12/0246* (2013.01); *G06F 12/1433* (2013.01)

(58) Field of Classification Search
None
See application file for complete search history.

(56) References Cited

U.S. PATENT DOCUMENTS 11,036,625 B1 * 6/2021 Balluchi ............. G06F 12/0868

FOREIGN PATENT DOCUMENTS

| GB | 2484997 A | * | 5/2012 | ......... G06F 12/1416 |
| KR | 20200023377 A | * | 3/2020 | ......... G06F 12/1483 |
| KR | 20200023378 A | * | 3/2020 | ......... G06F 12/1475 |

OTHER PUBLICATIONS

Granular Reclaim of System Firmware Address Space. IBM TDB NN9212253. Dec. 1, 1992. (Year: 1992).*

* cited by examiner

*Primary Examiner* — Kevin Verbrugge

(57) ABSTRACT

This invention presents a method for error-free, automatic generation of regions for Memory Protection Units (MPUs) to ease development of systems, using MPUs.

6 Claims, 6 Drawing Sheets

AUTOMATIC STATIC REGION GENERATION FOR MEMORY PROTECTION UNITS (MPUS)

PROGRAM LISTINGS stm32746g_irom_iram.icf is a linker command file showing how region sizes are defined and used for region block alignments and how fractions times region sizes are used for region block sizes. Also shown are block ordering blocks for ROM and SRAM.

mpatmplt.h contains the macros used to generate region structures and the constants used in such structures.

tmpu.c provides examples of templates using the above macros and constants. It also shows how pragmas are used to define code and data sections and it contains test programs that show how templates are used.

In order to run the foregoing code, it is necessary to have an evaluation copy of the SecureSMX RTOS. This is available for free download from ftp://ftp.smxrtos.com/pub1/patent_mpu345.zip. In addition, the IAR EWARM v8.20.1 development tools are needed. A free evaluation kit for these tools is available at www.iar.com. Also necessary is an ST Micro STM32746G-EVAL2 evaluation board to run the code. If this board is not available contact support@smxrtos.com for assistance in using another board.

CROSS-REFERENCE TO RELATED APPLICATIONS

Reference material for this application can be found in:
1. U.S. Pat. No. 10,635,831 B1 "Method to Achieve Better Security Using a Memory Protection Unit, Apr. 28, 2020 by Ralph Crittenden Moore,
2. U.S. Ser. No. 16/746,559 "Enhanced Security Via Dynamic Regions for Memory Protection Units (MPUs), Jan. 17, 2020 by Ralph Crittenden Moore, which are incorporated herein by reference in their entirety. In addition, two other MPU-related applications are being submitted simultaneously, by this author, which may be helpful.

BACKGROUND

As embedded systems are drawn more into the Internet of Things (IoT), hacks and malware attacks are becoming increasingly frequent. Thus, security of embedded systems is becoming increasingly important. One tactic to improve security is to divide the software of an embedded system into many isolated partitions. Then if a hacker gains access to one partition he cannot access code or data in other partitions.

Most embedded systems use Micro Controller Units (MCUs), which have lower performance processors and much less memory than other computer systems such as servers, desktop computers, or even smart phones. For memory protection, MCUs normally provide Memory Protection Units (MPUs) rather than Memory Management Units (MMUs) as are found in more powerful processors. Because of this and due to the fact that all MCU embedded system code is linked into a single executable, achieving full partition isolation is much more difficult in these systems than it is in more powerful systems using MMUs.

Partition isolation is achieved in MCU systems by defining code and data regions which are unique to each partition. A region consists of contiguous memory with a memory starting address, a memory size, and memory attributes. The attributes supported depend upon the MPU, but typically include read/write, read only, and execute never. When a task in a partition starts running, regions for its partition are loaded into the MPU. The MPU insures that only memory in these regions can be accessed and only as permitted by each region's attributes. This is very effective at thwarting malware.

A large majority of MCU-based systems that are in use are based upon the Armv7 Cortex-M architecture. Unfortunately the MPU in this architecture is difficult to use. Hence, very little use has been made of it and development of algorithms and software to use it are practically non-existent. The recently released Armv8 Cortex-M architecture corrects some of the problems, but it is not in widespread use yet and it shares some limitations with the Armv7 architecture.

The standard method to create regions is to use compiler pragmas in the source code to define which code or data goes into which section. Then a linker command file defines which sections go into a linker block. To this are added region size and region alignment in the linker command file to produce a region block. MPUs covered by this invention may also have subregions and subregion disables, which permit a region block to more closely fit the actual size needed. Finally the linker command file defines where the blocks go in memory.

Current state-of-the-art linkers do not define subregion disables for use by the compiler. This must be done manually by the programmer, which can result in serious errors being introduced into the code, as explained below.

SUMMARY OF THE INVENTION

The subject matter of this invention is the introduction of a method to generate MPU region structures automatically and hence error-free. The primary problem doing this is to generate the subregion disable (SRD) field in the region structure. This invention presents a unique technique to generate the SRD field from the region block size provided by the linker to the compiler. Thus the full region structure can be generated automatically and is not subject to human error. In addition, the method includes ordering region blocks to reduce lost memory due to alignment gaps.

DETAILED DESCRIPTION

Figure 1:
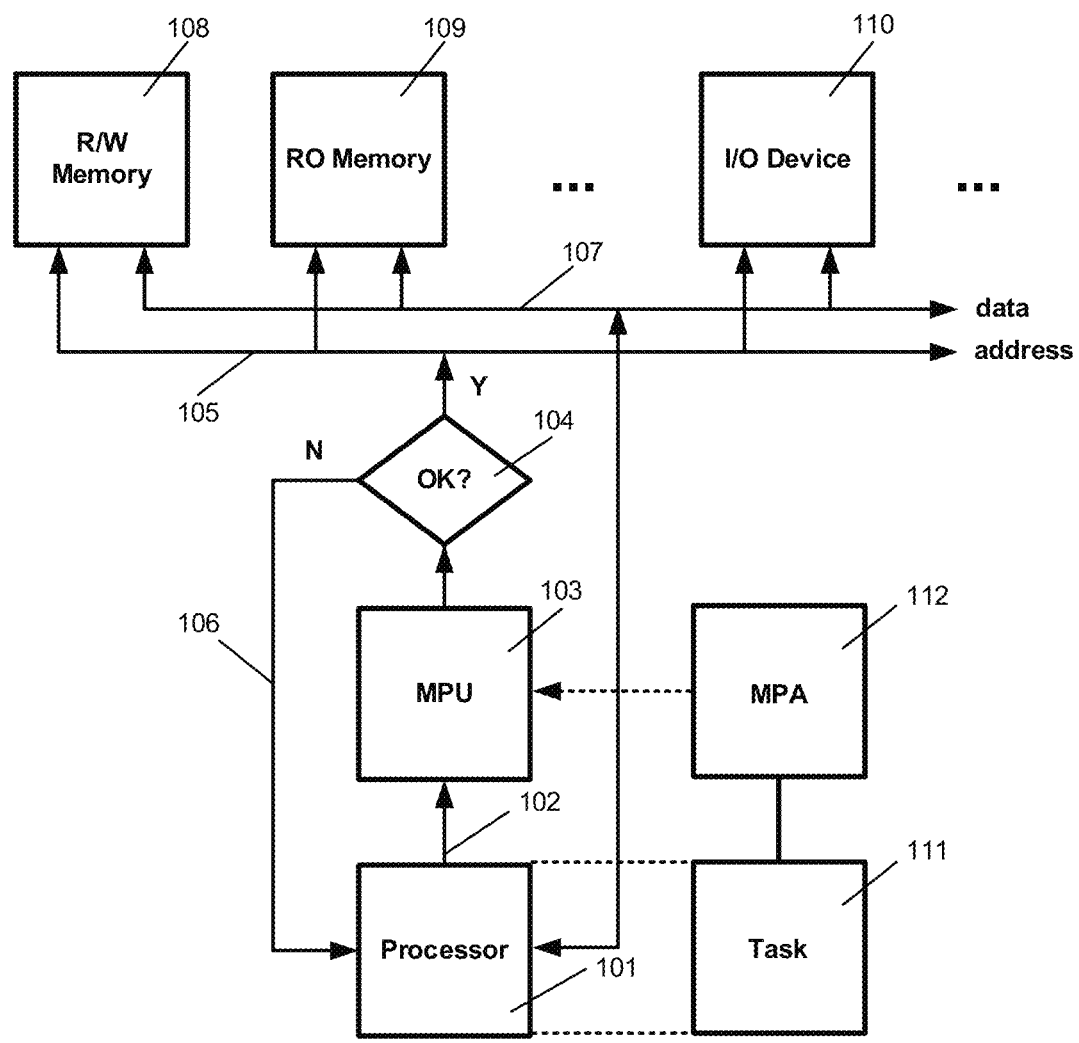
FIG. 1 shows the preferred embodiment of the inventive material herein.
Figure 2:
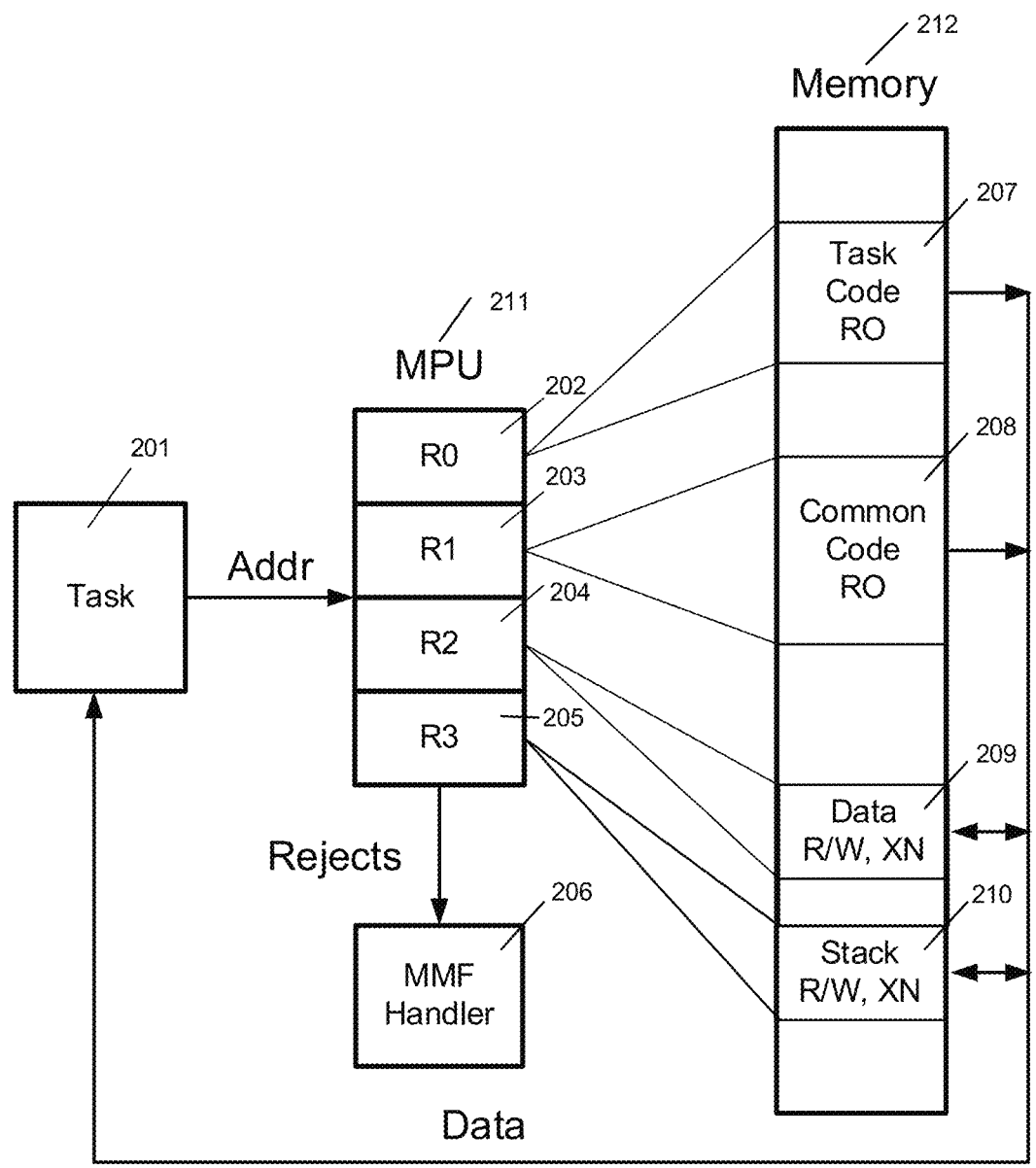
FIG. 2 illustrates MPU operation. Each region in the MPU allows access to a specific memory region with attributes, as shown.

The following information describes a simple embodiment of the invention sufficient to explain how it works. The term "application" is understood to mean the software in an embedded device that performs the functions of that device. FIGS. 1 and 2 illustrate the structure and operation of the preferred embodiment. They are for reference, only, and not part of the inventive material.

To simplify the figures and discussion that follows, the following assumptions are made concerning MPU regions:

R0=32 bytes, where R0 is the smallest region size and it has no subregions.

R(n+1)=2*Rn—each larger region is twice the size of the previous region.

N=number of equal-size subregions and must be 4 or 8.

These requirements are consistent with Armv7 Cortex-M MPUs. The subregion disable, SRD, algorithm described below requires N to be 4 or 8 and that R0 not be a multiple of 3 for N=4 and that R0 not be a multiple of 3, 5, nor 7 for N=8. However, it should be apparent, to one skilled in the art, that R0 can be any number that meets these requirements and that is large enough so that 2*R0 can contain N subregions.

There are more general SRD algorithms than the one presented herein, but these must be implemented using functions and therefore cannot be evaluated by a compiler. The SRD algorithm described herein can be implemented as a macro that can be evaluated during compilation. This allows the entire MPU region in a template to be loaded at compile time, rather than loading the SRD portion of each region at run time. The latter is undesirable because a programmer could easily forget to generate an SRD. In addition, this also allows templates to be stored in ROM to protect them from tampering by hackers.

FIG. 1 shows the preferred embodiment of this invention consisting of processor 101 sending a memory address 102 to a Memory Protection Unit (MPU) 103. The MPU 103 compares the address 102 to its regions and passes the address on to the system address bus 105 if it is ok. Otherwise, MPU 103 sends a Memory Mange Fault (MMF) exception 106 back to processor 101 and no access to memory nor FO occurs.

If ok, address 102 is sent to Read/Write Memory 108, Read-Only Memory 109, and FO Device 110 and any other memories or devices connected to address bus 105. Whichever of these devices recognizes the address then receives data from processor 101 via system data bus 107 or sends data to processor 101 via system data bus 107.

FIG. 1 also shows that MPU 103 is loaded from Memory Protection Array (MPA) 112 at the time that its task 111 starts running on processor 101. Each task 111 has its own MPA 112, which contains the regions that it is allowed to access.

It should be apparent, to one skilled in the art, that other embodiments are possible, such as: multiple processors (either multiple cores on the same chip or multiple processors on different chips), multiple MPUs each connecting to the same or to different system buses, multiple system buses, and other types of memory.

In addition, the preferred embodiment of the inventive material herein uses the Arm v7 Cortex-M MPU. It should be apparent, to one skilled in the art, that embodiments using other MPUs that have subregions and subregion disables are also supported.

FIG. 2 illustrates typical MPU operation. It shows task 201 sending an address to MPU 211 having 4 regions, as follows: Region 202 addresses task code read-only region 207 in memory 212. Region 203 addresses common code read-only region 208. Region 204 addresses data read/write, execute-never region 209. Region 205 addresses stack read/write, execute-never Region 210. An address that does not fall into one of these regions or does not have the correct attributes goes to the Memory Manage Fault Handler (MMF) 206. Otherwise, task 201 is allowed to read or write the desired data.

For simplicity, FIG. 2 shows 4 MPU regions. However, it should be apparent, to one skilled in the art, that it applies equally to MPUs with 8, 16, or any other number of regions.

Figure 3:
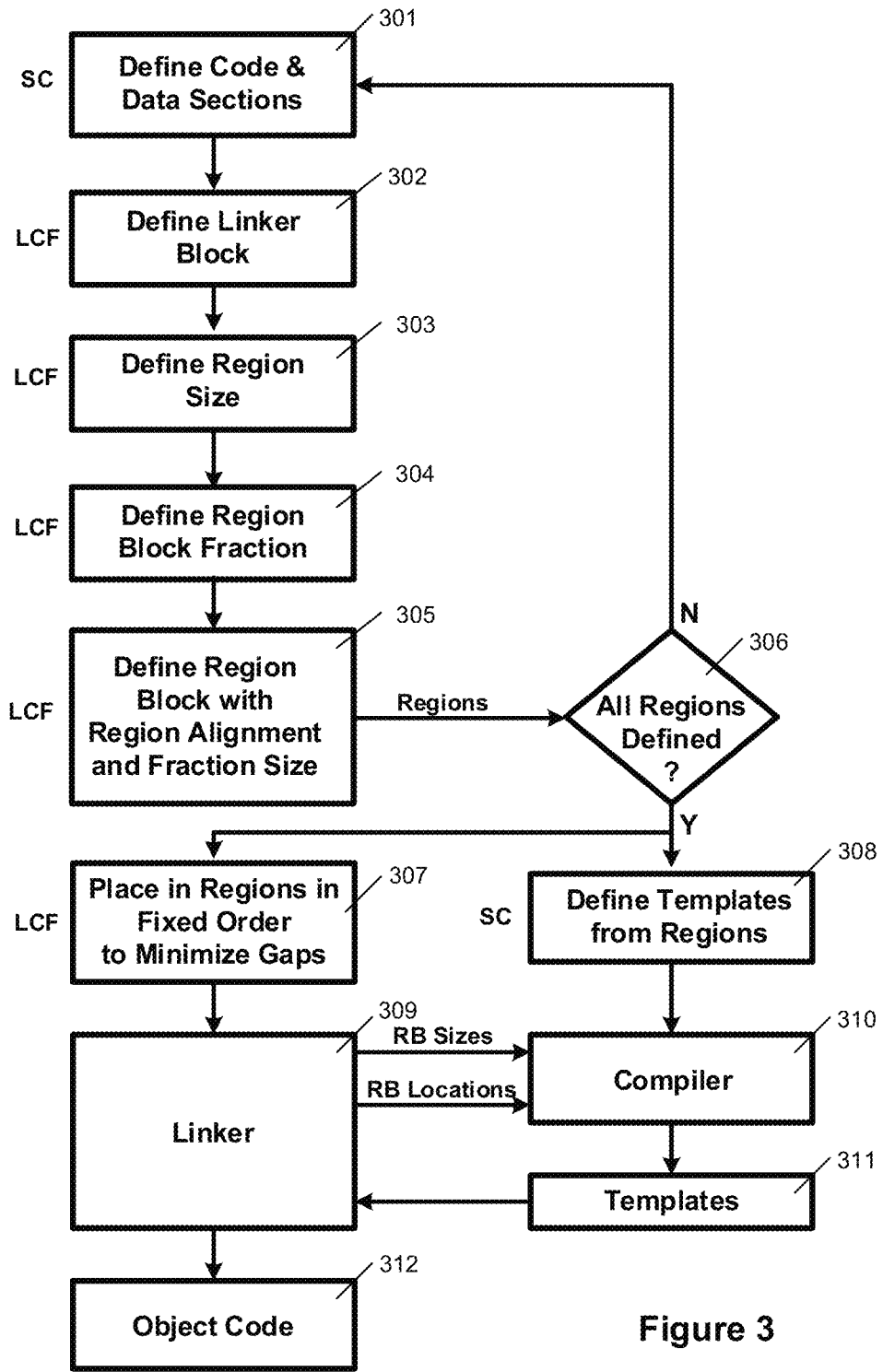
FIG. 3 illustrates the general method of this patent to create active MPU regions.

FIG. 3 illustrates the method of this invention to create MPU regions. First, code and data sections are defined 301 in the Source Code (SC) using compiler section pragmas. Next all sections intended to be in the same region are merged into a linker block 302 in the Linker Command File (LCF). Then the smallest region size that is large enough to hold the linker block is defined 303. The smallest fraction size of ⅝, 6/8, ⅞, or 8/8=1 is found 304 such that the smallest fraction times the region size is large enough to hold the linker block. A region block is then defined 305 by applying the region size as the alignment and the fraction times the region size as the block size to the linker block.

Figure 6:
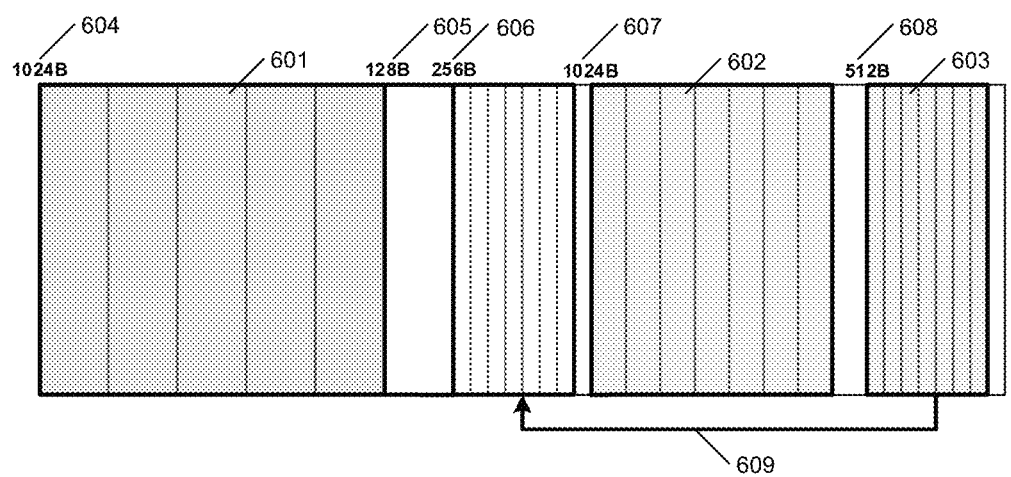
FIG. 6 shows how a smaller region can be moved into the gap between larger regions.

If all region blocks have been defined, they are placed in fixed order into a memory block 307 for each memory region (e.g. SRAM) in order to minimize gaps caused by region block alignments. This process is illustrated in FIG. 6. It can be done manually or by using a computer program which tries all block orderings until if finds the one with least memory lost to gaps.

Templates 308 are defined from regions and fed into compiler 310. Linker 309 provides the region block sizes and region block locations to compiler 310, which generates templates 311 composed of the regions. These are fed back into linker 309 to produce the final object code 312.

Figure 4:
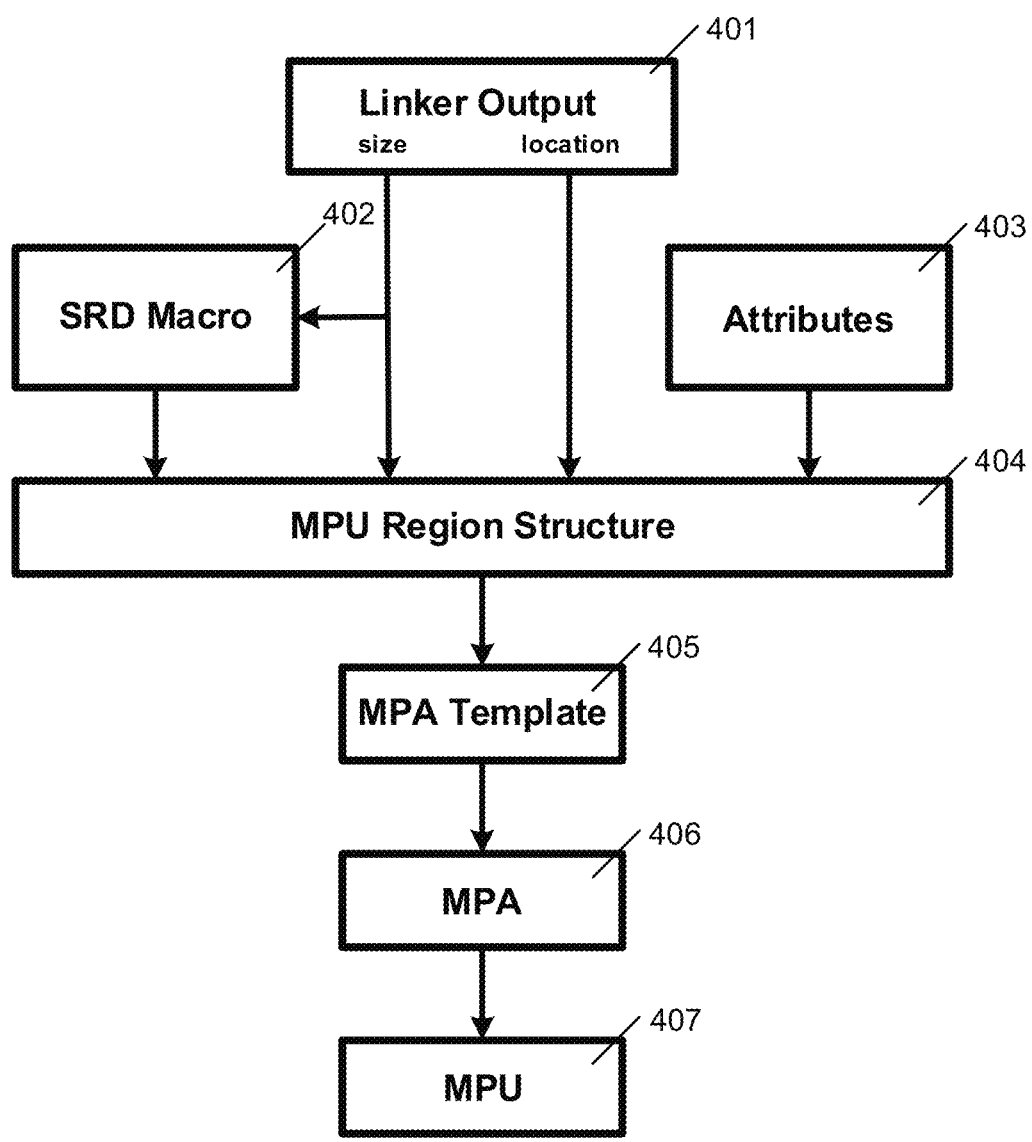
FIG. 4 shows MPU region generation, in detail.

FIG. 4 shows MPU region generation, in detail. Linker output 401 consists of region block size and region block location. Subregion disables are not provided by the linker. The Subregion Disable (SRD) field is generated by SRD macro 402 from the region block size and is loaded into the MPU region structure 404. The SRD macro 402 calculates the block size modulo 5, 6, and 7. The one that produces a 0 result is the numerator of the fraction that was used to determine the region block size 304 in FIG. 3. Hence the Subregion Disable Field is 0xE0, 0xC0, or 0x80, respectively. This algorithm works because the region block size must be a multiple of 2^n and 5, 3, or 7. Hence only one of the numerators can divide it evenly. Linker 401 size and location are inputs to other macros that generate the corresponding fields of MPU region structure 404. Attributes 403 are selected by the programmer and added to region structure 404. MPA template 405 is composed of regions that are loaded into a task's MPA 406, which in turn is loaded into the MPU 407 when the task is running. (See FIG. 2.)

Figure 5:
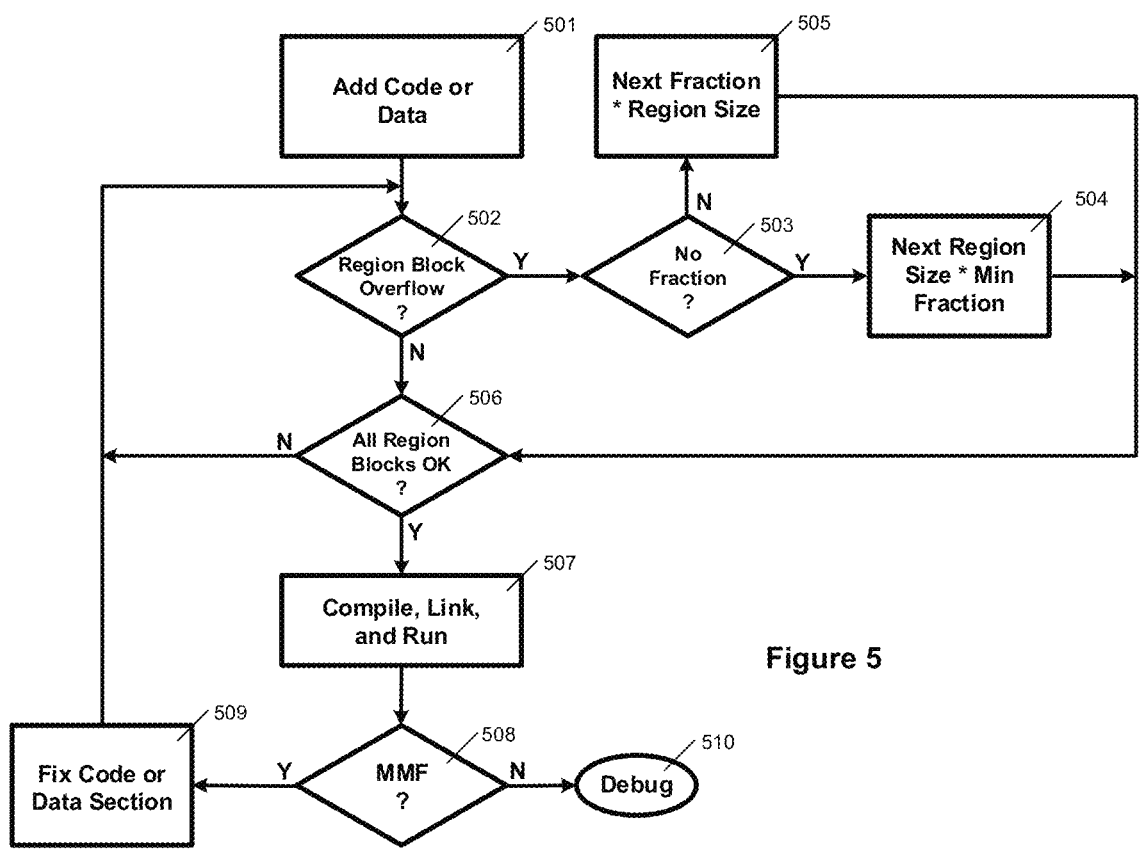
FIG. 5 shows the method for increasing region block sizes as more code and more data are added during development.

FIG. 5 shows the method for increasing region block sizes as more code and data are added 501 to a region, during development. It is important that an easy method be available to do this because debugging is an intensive activity and as code and data are added, the linker frequently reports region block overflows 502, which are distracting to the programmer. If no fraction is in use 503, then it is necessary to double the region size and change the fraction to ⅝ 504. Otherwise, the next larger fraction is selected 505. If more than one region block has overflowed 506, the process is repeated. Otherwise code is compiled, linked, and run 507. If an MMF occurs, it is necessary to fix a code or data section 509 and possibly adjust another region size 502. Otherwise debug 510 can resume. It is very important that this process be as simple and automatic as possible, else debug time will be wasted chasing region definition errors.

FIG. 6 shows how a smaller region 603 can be moved into the gap between two larger regions 601 and 602. This figure shows a section of memory with addresses increasing to the right. Region block 601 has a region size, and thus an alignment, of 1024 bytes and uses its first 5 subregions.

Region block 602 has a region size, and thus an alignment, of 512 bytes and uses its first 7 subregions. Region block 603 has a region size, and thus an alignment, of 256 bytes and uses its first 7 subregions. 604 is a 1024-byte boundary meaning that 1024 can evenly divide its address. Boundaries 605, 606, 607, and 608 are 128-, 256-, 1024-, and 512-byte boundaries, respectively. However, for these boundaries these are the largest values that can evenly divide their addresses.

Between region blocks 601 and 602, there is a 128*3=384-byte gap. Region block 603 requires 256 bytes, so it should fit into this gap. However, it cannot be moved to boundary 605 because that is a 128-byte boundary. So region block 603 must be moved to boundary 606, a 256-byte boundary, as shown by arrow 609. This corresponds to subregions 6 and 7 of region 601 and is 256 bytes in size. Note that subregion 5 of region 601 is still open. Thus a 128-byte, or smaller, region block could be put into it. Also note that a 512-byte region block could now be put at boundary 608, in place of the 256-byte block 603.

CONCLUSIONS, RAMIFICATIONS, AND SCOPE

As presented in the foregoing detailed descriptions, the linker outputs the region block size and location to the compiler, but not subregion disables. Normally, the programmer specifies the region block size=(region size−disabled subregions) in the linker command file and then manually determines and enters the SRD field into the MPU region structure in his source code. This is an error-prone process, especially when the programmer's attention is on debugging his code, as illustrated in FIG. 5. It is easy for him to make a mistake in selecting the correct SRD value or even forgetting to change it at all. As a consequence, it can easily happen that the region disables in an MPU region structure do not match the region block allocated by the linker.

For example, due to region block overflow, the programmer may have increased the region block by one subregion, but forgot to clear the subregion disable in the MPU region structure. It could be that the overflow was due to just a single variable. Hence only one variable is put into the new subregion by the linker. This could be any variable—the programmer has no control over which variable it is. The variable could be a rarely used variable associated with some exceptional condition, such as an error. Such a bug could elude even thorough testing and the system could ship with the bug in it. Sometime in the future, the exceptional condition could occur, the system could attempt to access the variable thus causing an MMF, and the system would stop running.

Alternatively, the programmer may have moved some variables or code out of a region and thus reduced its size by one subregion, this time forgetting to set the corresponding subregion disable in the MPU region structure. As a consequence, the linker might assign that subregion to a region of a different partition. Now, both partitions can access this common code or data. This creates a vulnerability that a hacker could exploit to access one partition from the other. It could be that one of the partitions contained valuable secret information or performed a mission-critical function, whereas the other partition might be of low importance and easily breached. Thus, the programmer and his company would have a false sense of security—they realize that the weak partition can be easily breached, but they think that the critical partition is safe, which it is not.

This invention prevents the foregoing problems by automatically generating subregion disables from the region block size provided by the linker to the compiler. Hence, it eliminates these possible programmer errors.

The invention claimed is:

1. Method to automatically generate regions for memory protection units, which can be loaded with a multiplicity of said regions, each controlling access to a specified memory or input-output area, and where each said region consists of a starting address, a size, and subregion disables, and said subregion disables disable subregions not needed by said region so that their memory areas can be used in other regions, as follows:
    defining sectors consisting of contiguous code or data in the source code and grouping like said sectors into region blocks;
    defining the smallest region size, which is a power of two times the smallest permitted region size, that said region block will fit into and assigning said region size to be the alignment of said region block;
    defining the smallest region size that said region block will fit into as said region size times a fraction where said fraction equals a subregion number divided by the number of subregions per region and where said subregion number is greater than one half of the said number of subregions per said region;
    using a macro in said source code that finds said subregion number such that said region block size modulo said subregion number is 0 and said macro uses said subregion number to generate said subregion disables for said region.

2. The method of claim 1 wherein said region block is defined in a linker command file from which a linker provides said region block size to a compiler, which evaluates said macro with said region block size to determine said subregion disables.

3. The method of claim 2 wherein said region is thus automatically generated by said compiler and thus is free from possible programmer error.

4. The method of claim 2 wherein said region can be assigned by said linker to read-only memory in order to protect it from change by a hacker.

5. The method of claim 1 wherein gaps due to alignments of said region blocks are filled by placing smaller said region blocks between them.

6. The method of claim 5 wherein non-region blocks of various sizes are defined in said linker command file to help plug said gaps between said aligned region blocks.

* * * * *